ically of radial elements such as blades 5 disposed in an annular body 6. Rearward of said annular body 6 there is provided a second annular body 7 closed at its outer end by an inclined wall 8, so as to form a delivery scroll leading to a portion forming a collector 9a of a cross section increasing toward the end flange 9b.

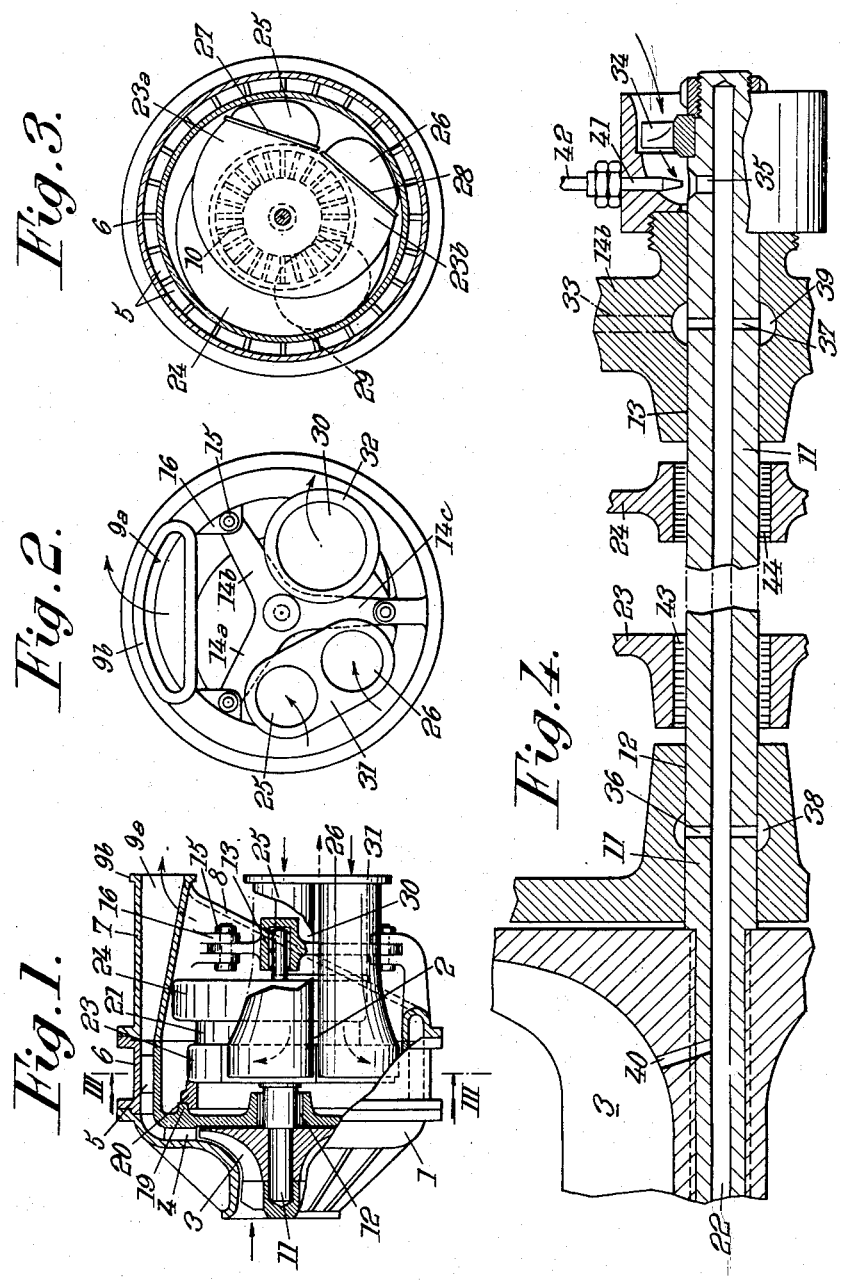

United States Patent Office 3,179,328
Patented Apr. 20, 1965

3,179,328
TURBO-COMPRESSORS
Robert Pouit, 3 Rue Auguste Mayet, Asnieres, France
Filed Nov. 26, 1962, Ser. No. 239,915
Claims priority, application France, Dec. 8, 1961, 881,427
2 Claims. (Cl. 230—116)

The present invention relates to turbo-compressors, this term including apparatus comprising a rotary compressor driven by a hot fluid turbine and having therewith a common rotor which comprises at least a compressor wheel and at least a turbine wheel both fixed on a common shaft. The invention is more especially concerned, among these turbo-compressors, with turbo-generators for gas turbines and with supercharging turbo-blowers for thermal engines.

It is known that the rotors of such apparatus, and in particular those including, as it is frequently the case, a centrifugal compressor driven by an axial turbine blade, generally include only two bearings, to wit a front bearing located on the side of the compressor and a rear bearing located on the side of the turbine. The front bearing may be mounted between the turbine and the compressor, the latter being then mounted in overhanging position at the end of said shaft and it is cooled by the air circulating through the compressor. The rear bearing, which supports the turbine wheel, and which in known constructions is carried by the casing of this turbine, is subjected to the high, and sometimes heterogeneous, temperatures of said turbine. The connecting elements interposed between the rear bearing and the turbine casing are thus subjected to differential expansions which tend to place this bearing in eccentric relation with respect to the front bearing, both if said rear bearing consists of a ball or roller bearing and if it is constituted by smooth bushes, the rubbing portion of which may be in this case dangerously threatened by the high temperatures.

The object of the present invention is to obviate these drawbacks.

For this purpose, the turbo-compressor is characterized by the fact that the compressor element thereof includes an annular delivery scroll which surrounds the turbine, the rear bearing of the rotor being carried by said scroll and the turbine casing being assembled to the compressor casing.

A preferred embodiment of the invention will be hereinafter described with reference to the appended drawings, given merely by way of example, and in which:

FIG. 1 is an elevational view, with parts in section, of a supercharging turbo-compressor made according to the present invention;

FIG. 2 is a rear view of this turbo-compressor, that is to say a view thereof seen from the right of FIG. 1;

FIG. 3 is a sectional view on the line III—III of FIG. 1; and

FIG. 4 is an axial sectional view on an enlarged scale of the turbo-compressor shaft and its bearings.

The turbo-compressor according to the invention may be used either as a supercharging unit for a thermal engine or as a generator of compressed gas to be fed to a driving gas turbine.

If it is supposed that according to FIGS. 1, 2 and 3, the turbo-compressor is intended for super-charging a thermal engine, this turbo-compressor comprises a compressor 1 of the centrifugal type the radial bladed wheel 3 of which is driven by the axial wheel 10 of a turbine 2, supposed to be of the axial type, driven by the hot gases escaping from the thermal engine, wheels 3 and 10 being mounted on a common shaft 11.

The air compressed by wheel 3 is sent into a first diffuser element consisting of radial elements such as blades 4 and into a second diffuser element consisting of axial elements such as blades 5 disposed in an annular body 6. Rearward of said annular body 6 there is provided a second annular body 7 closed at its outer end by an inclined wall 8, so as to form a delivery scroll leading to a portion forming a collector 9a of a cross section increasing toward the end flange 9b.

Turbine 2, which is coupled with compressor 1, is disposed inside the annular bodies 6 and 7 of compressor 1 in such manner as to protect the surrounding atmosphere against the radiating heat from the turbine and also against the noise produced by said turbine.

Rotor unit 3-10-11 is supported by two bearings 12-13 disposed on either side of turbine 2. The front bearing 12 may be provided upstream of radial wheel 3 (i.e. on the left hand side thereof in FIG. 1). It may also, as shown by FIG. 1, be located between the wheel 10 of turbine 2 and the wheel 3 of compressor 1, which is thus placed in overhanging position with respect to bearings 12 and 13. These bearings are made in suitable manner, either in the form of roller bearings or in that of smooth bearings.

According to the present invention, the rear bearing 13 is protected against the heat transmitted by conduction from turbine 2 by having this bearing 13 supported not, as it is usually the case, by the turbine casing, which is always at a high temperature, but, as shown by FIGS. 1 and 2, by the delivery scroll 7-8 of the compressor (the temperature of which is relatively low). In the example shown, this bearing 13 is supported through arms such as 14a, 14b, 14c, assembled accurately with said scroll 7-8 through pins 15 mounted in supports 16 rigid with said scroll 7-8. Centering of the casing of turbine 2 upon an element of the casing of compressor 1 is ensured by a projection 19 of the inner body 6 of said turbine cooperating with a ring 20 belongs to the casing of turbine 2. Fixation means, not shown, such as bolts, secure this turbine casing to the compressor casing.

Thus arms 14a, 14b and 14c are kept at low and uniform temperatures, whereby bearing 13 remains always coaxial with bearing 12.

I will now describe an advantageous arrangement of the feed and exhaust conduit of turbine 2 disposed, according to the invention, inside scroll 7-8.

As shown by FIGS. 1 and 3, turbine 2 comprises, in addition to the cylindrical housing 21 of turbine wheel 10, an inlet scroll 23 comprising two bodies 23a and 23b and an outlet scroll 24. The inlet and outlet scrolls are, as shown, advantageously offset in opposed directions with respect to shaft 11. Thus the motor gases are fed from a common outer flange 31 through two separate conduits 25 and 26 fixed through flanges 27 and 28 to the elements 23a and 23b of inlet scroll 23, whereas the outlet gases are evacuated through an orifice 29 provided in the end wall of exhaust scroll 24 and through a conduit 30 leading to an external flange 32.

With the arrangement according to the present invention, noise, which is one of the drawbacks of bearings, is greatly reduced by the sheath of air surrounding the turbine. Furthermore the bearings of turbo-compressors rotating at high speed (both concerning roller bearings and smooth bearings) have their resistance to wear and tear greatly reduced owing to the temperature of said bearings. The existence of high temperatures required, up to now, in known machines, an intensive circulation of lubricant flowing at high rate, which circulation was detrimental of the correct operation of bearings, by absorbing a non negligible energy and lowering the mechanical efficiency of the machine.

I greatly reduce friction in the bearings, and therefore the temperature of said bearings, by lubricating them by means of a small amount of compressed air, which may advantageously be mixed with a very small quantity of liquid lubricant so as to form a lubricating mist, as shown by FIG. 4.

Air is circulated to form a laminar flow in the bearings. For this purpose I provide in shaft 11 a longitudinal coaxial channel 22 which is closed at both ends. According to a first embodiment, shown in dotted lines by FIG. 4, this channel 22 is fed with compressed air from collector 9a and led to the rear bearing 13 through a channel 33 provided in one of the arms 14. According to another solution, shown in solid lines on this FIG. 4, I make use of air at a lower temperature (although less compressed) which is circulated through the channel 22 of shaft 11 by a small fan 34 mounted at one of the ends of said shaft so as to discharge or to suck in cold air through central channel 22 owing to the provision of holes 35. In the case where, as shown by FIG. 4, this fan 34 is provided at the rear end of shaft 11, compressed air is fed to bearings 12 and 13 through holes 36 and 37 opening into grooves 38 and 39, respectively, provided in bearings 12 and 13.

The use of such air bearings is directly related to the fixation of the stationary portion of these bearings to delivery scroll 7–8 since, in order to obtain a satisfactory operation of such air bearings, very small plays (averaging some microns) must be provided between the stationary portions and the rotating portions of these bearings. Up to the present time the importance of the expansion of said stationary portions due to their fixation to the turbine casing prevented the use of fluid bearings because the plays in question varied too much. It is owing to the fixation of the bearings on the delivery scroll of the compressor that the use of air bearings has become possible.

I may, according to the invention, obtain both lubrication of the bearings and cooling of the shaft by circulating, through channel 22, an excess of air which is allowed to escape through calibrated holes 40 opening advantageously between the radial blades 3 of compressor 1, near their roots.

Finally, although for speeds of rotation above a given value mere air cushions kept stable by a laminar flow between the surfaces in relative movement are sufficient to prevent seizing of the rotating portions, I may advantageously, and in particular at low speeds which occur after the device has been started, mix with the air cushion a small amount of atomized lubricant. For this purpose, as shown by FIG. 4, I provide in one of the air inlet holes 35, a nozzle 41 fed with lubricant from a conduit 42.

Between bearings 12 and 13 shaft 11 passes through the front wall of the inlet main 23 of turbine 2 and the rear wall 24 of said turbine main, respectively through two labyrinth packings such as 43 and 44, the known characteristics of such packings being that they ensure a sufficient liquid gas tightness without actual contact with shaft 11.

I thus ensure, owing to the very low coefficient of friction of air bearings, the principle of which is known, a very high mechanical efficiency while ensuring the cooling of the shaft and of its bearings themselves protected from the heat of the turbine by the devices above described.

All the arrangements above described in the case of a turbo-blowing plant for supercharging purposes obviously apply to turbine gas generators which include the same compression and expansion elements, similarly grouped and disposed, but which further include a combustion chamber interposed on the outside of the turbo-compressor unit between the delivery of the compressor and the inlet of the turbine.

In this last case the main feature of the invention, which consists in surrounding the high pressure turbine by the delivery collector of the compressor has the important advantage of recovering the calories dispersed by radiation by said high pressure turbine while increasing their thermal value by a heat pump effect.

In a general manner, while the above description discloses what is deemed to be a practical and efficient embodiment of the invention, the present invention is not limited thereto as there might be changes made in the arrangement, disposition and form of the parts without departing from the principle of the invention as comprehended within the scope of the appended claims.

What I claim is:

1. A turbo-compressor which comprises, in combination, a rotary compressor including a compressor casing, a compressor wheel rotatable in said casing and a delivery scroll carried by said casing, a hot gas turbine disposed inside said compressor delivery scroll, said turbine comprising a turbine casing, rigid with said compressor casing, a turbine wheel rotatable in said turbine casing, a common shaft having said compressor wheel and said turbine wheel fixed thereto, only two bearings for said shaft, to wit a front bearing carried by said compressor casing, and a rear bearing carried by said delivery scroll, longitudinally extending conduit means disposed inside said delivery scroll and opening into said turbine casing for feeding hot gases to said turbine and longitudinally extending conduit means disposed inside said delivery scroll for the outflow of gas from said turbine, said shaft being hollow, and means for circulating a cooling gas inside said shaft and for distributing this gas, in the form of a gas cushion, between said shaft and said bearings.

2. A turbo-compressor which comprises, in combination, a rotary air compressor including an annular casing, a compressor wheel rotatable in said casing and an annular delivery scroll carried by said casing forming a rearward extension thereof and communicating with the space within the casing, a hot gas power turbine disposed inside said annular scroll, said turbine comprising a turbine casing rigid with said compressor casing and a turbine wheel rotatable in said turbine casing, a common shaft having said compressor wheel and said turbine wheel fixed thereto, only two bearings for said shaft, to wit a front bearing carrried by said compressor casing, and a rear bearing directly carried by said delivery scroll on the inside thereof, longitudinally extending conduit means disposed inside said delivery scroll and opening into said turbine casing for feeding hot gases to said turbine, and longitudinally extending conduit means disposed inside said delivery scroll for the outflow of gas from said turbine.

References Cited by the Examiner

UNITED STATES PATENTS

| 1,368,751 | 2/21 | Rateau | 230—116 |
|---|---|---|---|
| 2,769,445 | 11/56 | Morgavi | 230—207 |
| 2,929,548 | 3/60 | Crooks et al. | 230—116 |

FOREIGN PATENTS 549,901  12/57  Canada.

LAURENCE V. EFNER, *Primary Examiner.*
ROBERT M. WALKER, *Examiner.*